United States Patent
Muhl

(12) 
(10) Patent No.: US 9,764,915 B2
(45) Date of Patent: Sep. 19, 2017

(54) ITEMS PROCESSING APPARATUS TO PLACE AND SINGULATION FLAT ITEMS AND METHOD

(71) Applicant: Wolfgang Muhl, Hohen Neuendorf (DE)

(72) Inventor: Wolfgang Muhl, Hohen Neuendorf (DE)

(73) Assignee: Francotyp-Postalia GmbH, Berlin (DE)

( * ) Notice: Subject to any disclaimer, the term of this patent is extended or adjusted under 35 U.S.C. 154(b) by 0 days.

(21) Appl. No.: 15/148,214

(22) Filed: May 6, 2016

(65) Prior Publication Data

US 2016/0325949 A1 Nov. 10, 2016

(30) Foreign Application Priority Data

May 7, 2015 (DE) .................... 20 2015 102 333 U

(51) Int. Cl.
    *B65H 5/06* (2006.01)
    *B65H 7/00* (2006.01)
    (Continued)

(52) U.S. Cl.
    CPC .............. *B65H 5/066* (2013.01); *B65H 1/06* (2013.01); *B65H 3/063* (2013.01); *B65H 3/0638* (2013.01);
    (Continued)

(58) Field of Classification Search
    CPC ...... B65H 27/00; B65H 3/063; B65H 3/0638; B65H 9/166; B65H 2404/15212;
    (Continued)

(56) References Cited

U.S. PATENT DOCUMENTS 4,443,006 A * 4/1984 Hasegawa .............. B65H 3/063
                                                          271/10.11
4,973,037 A * 11/1990 Holbrook ............... B65H 3/063
                                                          271/146
(Continued)

FOREIGN PATENT DOCUMENTS

DE    20 2012 011 876 U1    1/2013
DE       202012011876 U1    3/2013

*Primary Examiner* — Patrick Cicchino
(74) *Attorney, Agent, or Firm* — Schiff Hardin LLP

(57) ABSTRACT

An items processing apparatus for placement and singulation of flat items has a placement device and a feed deck and a separation device. A portion of the placement device is arranged below the placement deck of the apparatus. The feed deck has an opening for an separation roller, and a portion of the separation device arranged above the feed deck. This portion and the separation roller form a gate of the separation device for the singulation of a stack of flat items. A control computer controls the placement device and separation device. The placement device is equipped for edge alignment of a stack of flat items with different formats and has at least two transport elements, which enable an automatic displacement of the stack transverse to the transport direction and placement of the stack at an alignment wall, as well as a transport of the stack in the transport direction toward the feed deck of the separation device, as well as a displacement of the stack counter to the transport direction. A movement assembly is provided to move the portion of the separation device in a direction counter to the transport direction. The control computer controls the alignment state of the transport elements of the placement device of the items processing apparatus, and controls the movement of the portion of the separation device. The aforementioned portion enables a displacement of the stack counter to the transport direction.

14 Claims, 10 Drawing Sheets

(51) Int. Cl.
*B65H 27/00* (2006.01)
*B65H 7/02* (2006.01)
*B65H 9/04* (2006.01)
*B65H 3/54* (2006.01)
*B65H 3/52* (2006.01)
*B65H 3/06* (2006.01)
*B65H 9/16* (2006.01)
*B65H 3/56* (2006.01)
*B65H 1/06* (2006.01)
*B65G 39/02* (2006.01)

(52) U.S. Cl.
CPC ......... *B65H 3/0669* (2013.01); *B65H 3/0676* (2013.01); *B65H 3/5238* (2013.01); *B65H 3/54* (2013.01); *B65H 3/565* (2013.01); *B65H 5/062* (2013.01); *B65H 7/00* (2013.01); *B65H 7/02* (2013.01); *B65H 9/04* (2013.01); *B65H 9/166* (2013.01); *B65H 27/00* (2013.01); *B65G 39/025* (2013.01); *B65H 2403/5331* (2013.01); *B65H 2403/92* (2013.01); *B65H 2404/1314* (2013.01); *B65H 2404/1544* (2013.01); *B65H 2404/15212* (2013.01); *B65H 2404/15422* (2013.01); *B65H 2404/623* (2013.01); *B65H 2701/1916* (2013.01); *B65H 2801/78* (2013.01)

(58) Field of Classification Search
CPC ...... B65H 2404/623; B65H 2404/1544; B65H 2404/5331; B65H 2404/15422; B65H 2801/78; B65H 5/066
See application file for complete search history.

(56) References Cited

U.S. PATENT DOCUMENTS

| | | | |
|---|---|---|---|
| 5,184,811 A * | 2/1993 | Sardella | B65H 3/063 271/10.11 |
| 6,267,372 B1 * | 7/2001 | Mylaeus | B65H 3/063 271/226 |
| 6,412,770 B1 * | 7/2002 | Demmeler | B65H 3/34 271/104 |
| 7,416,183 B2 * | 8/2008 | Beckstrom | B65H 9/106 271/2 |
| 7,537,207 B2 | 5/2009 | Kuntzer et al. | |
| 7,934,715 B2 * | 5/2011 | Trudeau | B65H 3/063 271/2 |
| 8,302,960 B2 * | 11/2012 | Kato | B65H 1/06 271/119 |
| 2013/0106048 A1 | 5/2013 | Geserich et al. | |
| 2014/0163723 A1 | 6/2014 | Geserich | |

* cited by examiner

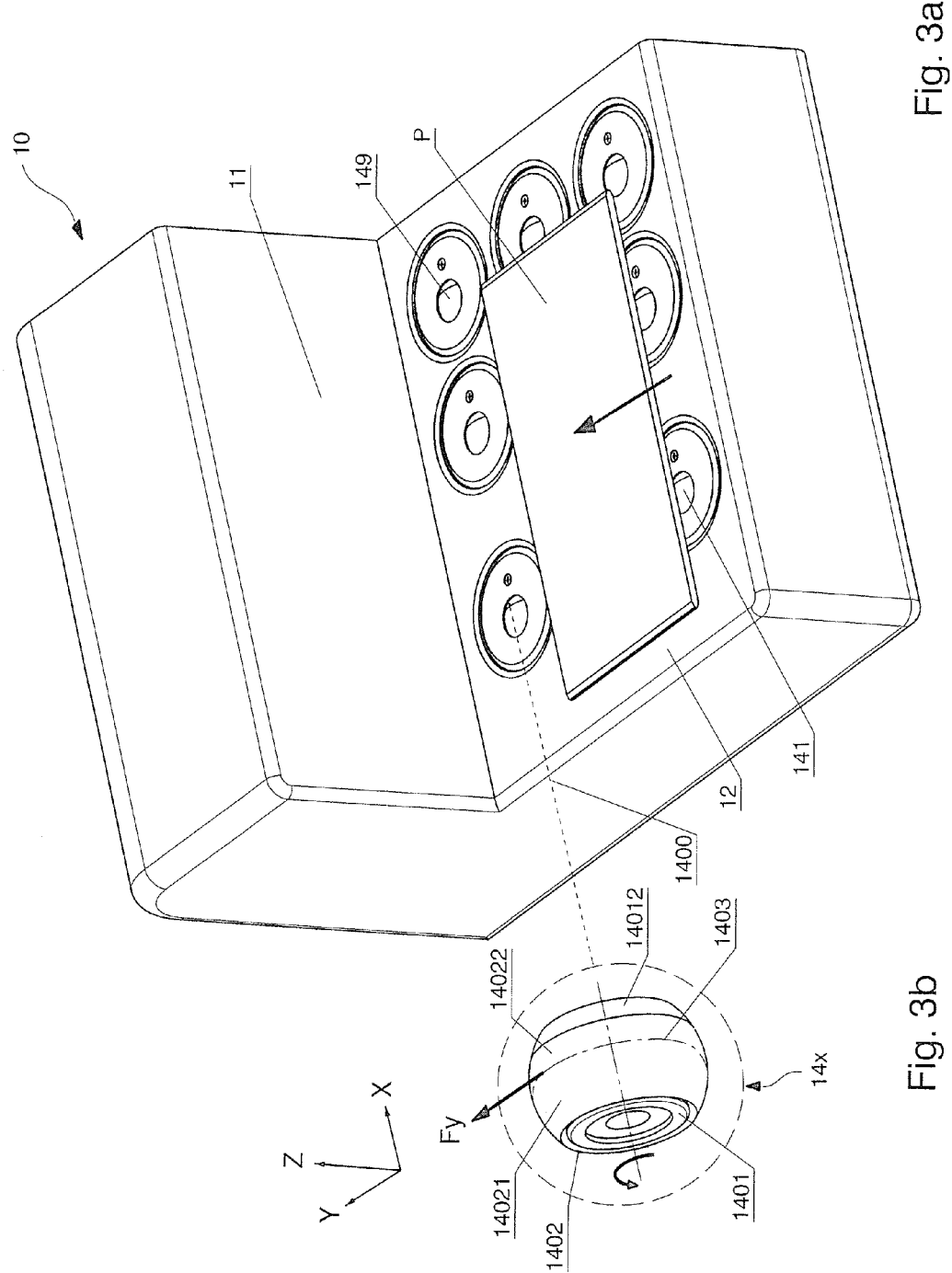

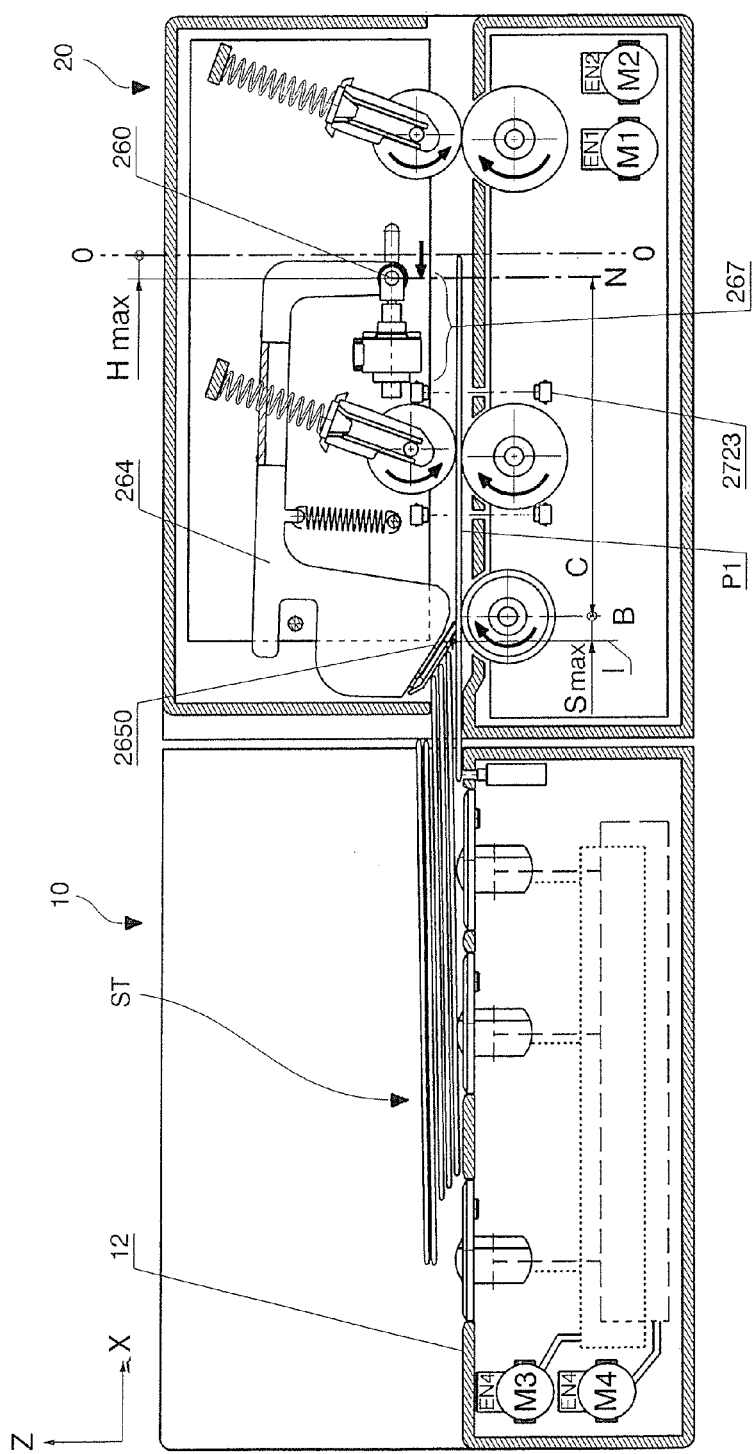
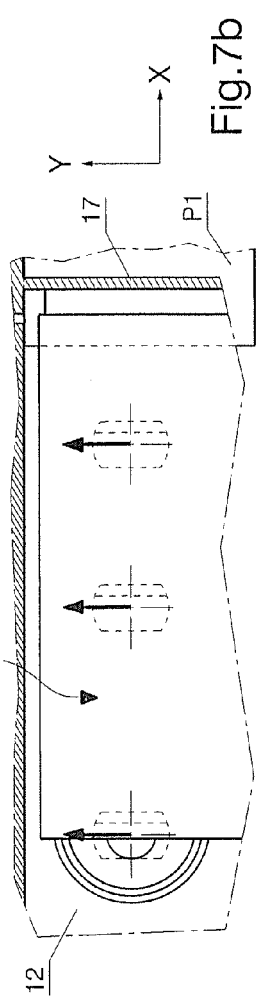

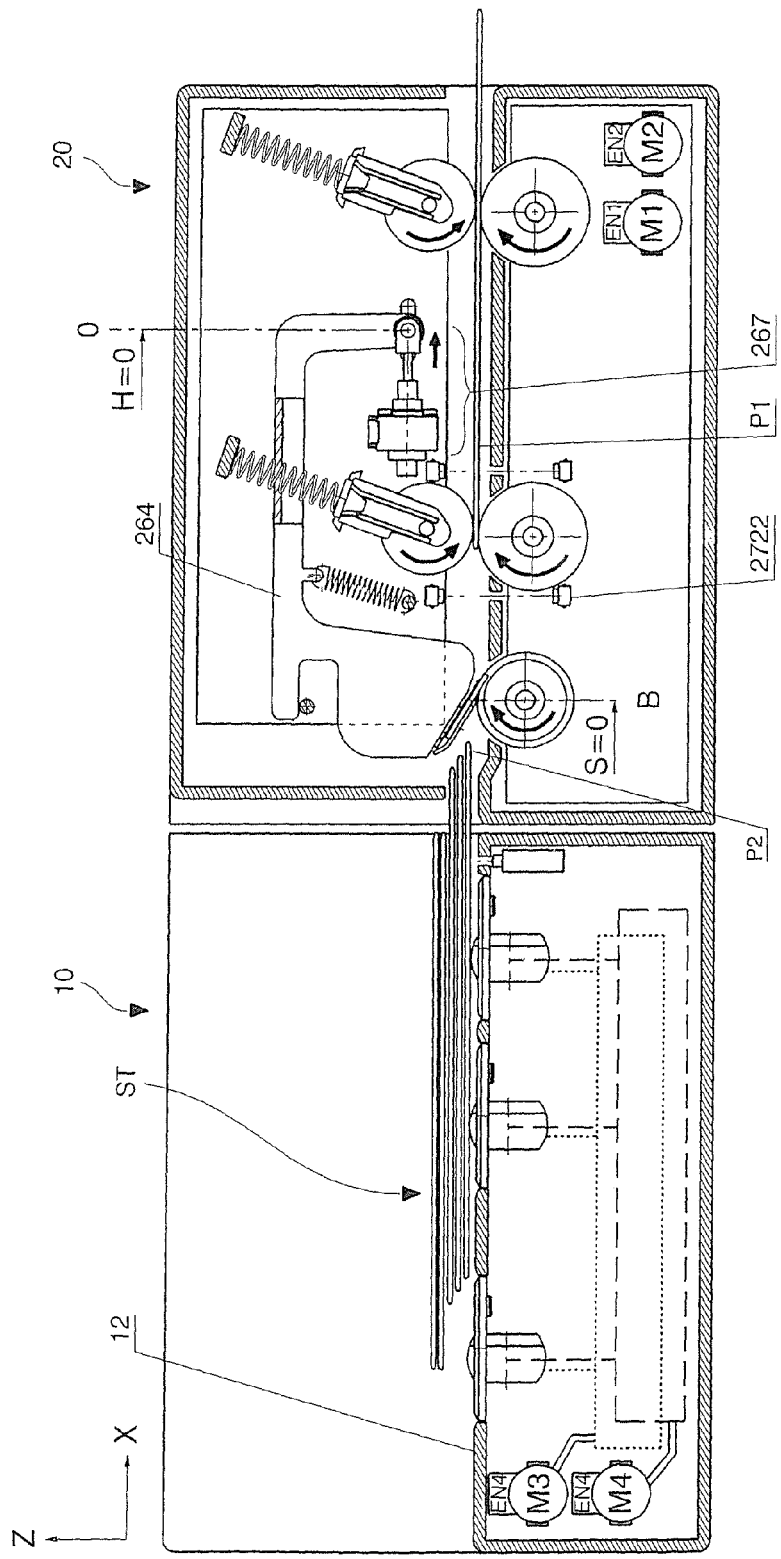
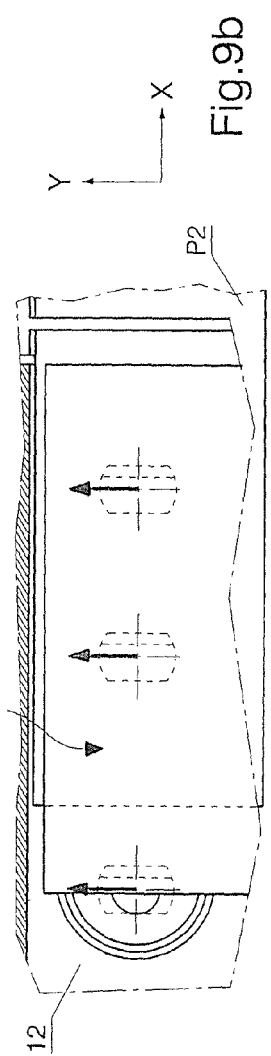

ITEMS PROCESSING APPARATUS TO PLACE AND SINGULATION FLAT ITEMS AND METHOD

BACKGROUND OF THE INVENTION

Field of the Invention

The invention concerns an items processing apparatus to place and singulation of flat items. Such apparatuses are used as, for example, modules of items processing systems or as stations of a mail processing path.

Description of the Prior Art

A mail processing path of a franking system is composed of individual mail piece processing stations arranged in sequence. A placement station serves to place single or stacked mail pieces and is situated upstream in terms of the mail flow, i.e. at the start of the mail processing path. A stack of mail pieces of different formats (mixed mail) that has been placed at the placement station is separated in the mail processing path by an separation device of a feed station (this separation device immediately following in the transport direction) since additional following mail piece processing stations require singularly supplied mail pieces. The placement and separation stations of the mail processing apparatus, or specifically the items processing apparatus for placement and separation of flat items, are provided for use in connection with subsequent items processing devices, for example in connection with franking machines, addressing machines and other printing mail processing apparatuses.

As used herein, "mixed mail" means mail pieces of similar format that differ by up to 10% in height and width, within limits, for example letters of formats B6 (12.5×17.6 cm) and C6 (11.4×16.2 cm).

When a "stack" is discussed in the following, this means letter stacks, postcard stacks and other mail piece stacks or a different stacked item that can be separated.

In the field of franking machines, mechanisms are known that transport a mail piece downstream (in terms of the mail flow) in the transport direction, and print the mail piece with a franking imprint during the transport.

In the Centormail® franking machine that is commercially available from Francotyp-Postalia GmbH and Francotyp Postalia USA, such mixed mail is transported by means of a transport belt while standing on edge, wherein an alignment of the mail pieces by gravity automatically takes place at the edge.

In the field of franking machines, solutions are also known—for example the PostBase® franking machine that is also commercially available from the above sources—that transport a mail piece resting on its side downstream (in terms of the mail flow) in the transport direction. An automatic feed station may precede the franking machine at the mail intake side. A modular placement device of a feed station has been described in German utility patent DE 20 2011 107 379 U1 (U.S. Pat. No. 8,702,090 B2). The feed station follows downstream (in terms of the mail flow) of a placement station. The latter is designed as a purely manually operable module without its own drive engineering, the placement deck of which may be set up like a ramp as needed. Due to the ramp design in such a manner, gravity is used to assist in the supply of mail pieces. However, no alignment of the mail pieces takes place due to gravity. Rather, a slide is provided with which a stack is manually pressed onto a guide plate of the placement station, this guide plate serving as an alignment wall. However, it cannot be ensured with this design that all mail pieces of a mixed mail stack will rest with their side edge against the alignment wall. This edge alignment uncertainty is problematic when the mail pieces transported lying on their side should be aligned at an alignment, placement or guide wall without the assistance of gravity.

Known mail processing apparatuses supply the lowermost mail piece of a mail piece stack to the alignment wall by driven rollers. A feed station for a mail handling machine that is provided to handle mixed mail (filled envelopes with open or closed envelope flap) at high speed is known from U.S. Pat. No. 4,973,037. This is equipped with a stack plate, a device for transverse movement of a side wall relative to the stack plate, and transport devices in a stack magazine region. A portion of the transport devices is situated below the stack plate. The side wall serves as an alignment surface against which the flap edges of envelopes may be brought to a stop.

Means are provided for transporting the mail pieces both downstream and in the direction toward the alignment wall, as well as to loosen the mail pieces (open or closed, filled letter envelopes) of a stack so that they may slide over one another more easily. These transport means are eccentrically designed loosening rollers with different coefficients of friction. Roller groups are driven by a motor and move back and forth periodically in a small angle range by means of a disc cam. Moreover, a repeated inclined positioning of the mail stack plate in the stack magazine region is proposed in order to utilize the force of gravity for the alignment of the mail pieces. Upon transitioning into the supply region, due to the repeated inclined positioning of the mail stack plate in the stack magazine region the letter envelope may possibly also be horizontally pinched, in particular given an open envelope flap. An alignment of the mail pieces is possible only to a limited degree via the small angle range. Moreover, the placement cover is large relative to the largest format of a mail piece, such that small dimensions of the base of the mail processing apparatus cannot be achieved.

Moreover, an alignment can be achieved only as long as the letter envelope has not reached the separation gate. As soon as the letter envelope rests at the gate entrance, it is drawn into the separation gate. A displacement of the stack and its alignment at the alignment or placement wall is then no longer possible. Means to loosen a stack of mail pieces are used in order to reduce the stiction between the mail pieces, which enables an alignment of the stack at the alignment wall before the separation of the mail pieces. The means for loosening a stack of mail pieces (letters) are, however, ineffective when multiple mail pieces (letters) have already been driven into the separation gate. Consequently, it must either be prevented that multiple mail pieces (letters) are driven into the separation gate, or the status must be retroactively corrected. An advantage of the separation of the respective lowermost mail piece is to provide the possibility of refilling additional mail pieces from above onto the stack, which is possible without interrupting the operation of the separation device. However, the weight of the stack is thereby increased, and thus the stiction is also increased between the lowermost mail piece and the respective following mail piece that is to be separated. That in turn leads to the situation that a number of thin mail pieces (letters) is increasingly drawn into the separation gate.

Given a mixed mail stack with a few thick mail pieces (letters), a hard-set separation gap cannot be used; rather, the mail pieces (letters) push the separation gate apart depending on their thickness. Letters may remain stuck to one another not only due to the stiction but also due to electrostatic charge. More than one letter may thus be driven into the separation gate simultaneously, which occurs increasingly given thin letters of the mixed mail stack, and causes unwanted malfunctioning. An additional problematic state occurs in a separation device in the event that, after each removal of the respective lowermost letter of the stack, the subsequent letters are always drawn further into the gate than the respective preceding letter before the subsequent letter. In order to minimize these malfunctions, such gates are preset to a required thickness range. That in turn limits the mixed mail capability of the separation device.

A feed station is known from German utility patent DE 20 2012 011 876 U1. The feed station has a pre-separation region, a separation region and a transport region. The transport region is arranged along a transport path, after the separation region in the transport direction. A processor of a control computer of the feed station is programmed to reduce the gap between the individualized flat items to a desired clearance through a corresponding control of transport rollers. The transport rollers are arranged in the transport region. The separation region lets through letters with a maximum thickness of 10 mm. The throughput of the separated letters is limited to 65 letters per minute.

In German utility patent DE 20 2012 011 877 U1 (U.S. Pat. No. 8,965,568 B2), a feed station is disclosed to supply a flat item that rests lying on its side at a placement station and is singulated or is separated from a stack and transported downstream by means of the feed station in order to supply the item to a subsequent items processing apparatus. A control computer has a processor, a signal processing means for the signals of the sensors and the encoders, and a determination unit to determine the position of the flat item. The processor of the control computer is programmed to increase a gap between the separated flat items to a desired clearance. According to DE 20 2012 011 877 U1, the stack is situated with the respective lowermost flat item partially on a first separation roller, which is arranged in the pre-separation region of the feed station. A second separation roller is arranged at a clearance from this (in the transport direction) in the separation region of the feed station.

A contact pressure box that can be vertically displaced for maintenance purposes is installed at a frame of the feed station. The contact pressure box has two contact pressure rollers charged with elastic force, wherein the elastic force is exerted by compression springs. The compression springs are supported inside the contact pressure box. The contact pressure box is mounted in the frame so as to be lockable. The two contact pressure rollers press with an elastic force on two transport rollers whose rotation axis shafts are borne under the cover, on the frame of the feed station, and which respectively protrude upward in the transport region through separate openings in the cover of the feed station. During the transport, a flat item is pinched by the two pairs of contact pressure rollers-transport rollers and transported further along the transport path. The contact pressure roller has a pivotable linkage, which charged with elastic force by a tension spring—exerts a contact pressure force via multiple separation fingers on a flat item to be singulated in the separation region of the feed station, which flat item enters into a gap between a second separation roller and the separation fingers as a result of the driving of the transport elements of the placement station. Measures which should prevent the entrance of multiple thin, flat items into the gap (DE 20 2012 011 877 U) have been taken before and above the gap. The separation device of the feed station has a gate for flat items that is formed in multiple stages in the separation region and comprises at least one pre-gate and a main gate. A stack of flat items on the feed deck rests on the mail intake-side wall of a housing part of the feed station. The lower edge of the housing part forms a first stage that is situated approximately 30 mm above and in parallel with the surface of the feed deck. The first separation roller projects approximately 6.5 mm beyond the surface of the feed deck. This first stage holds back the flat items as of a stack height of greater than 23.5 mm. A stack stop surface with stepped, angled plate at the lower edge of a pre-separation region forms a second stage of holding back the stacked flat items of the stack. The latter is installed at the head end of the linkage. A majority of the shaped body of the linkage, which forms a long lever arm in the transport direction, is situated between the head end of the linkage and the rotation point of the rotatably borne linkage. The lower side of the step of the inclined angle plate is situated approximately 18.5 mm above the surface of the feed deck, for example. As a result of this, only a single, thick, flat item with a maximum thickness of 12 mm, or multiple thinner flat items, may pass this step. Following after the aforementioned step are the pre-separation fingers attached above at the head end of the linkage and pointing angled downward in the transport direction, and following downstream is a ramp plate (likewise arranged inclined) to which the separation fingers are attached. The latter, together with the second separation roller, forms the main gate. Although the separation region is formed in multiple stages, according to DE 20 2012 011 877 U1 this design is not suitable for all flat items; rather, it was developed for mail pieces in particular.

SUMMARY OF THE INVENTION

An object of the invention is to develop an items processing apparatus to place and singulate flat items, having a placement device or a placement station that—together with a separation device or a feed station—enables a higher throughput of flat items which are transported lying on their sides. In particular, the placement station, together with the feed station, enables a higher throughput of at least 90 mail pieces of C6 DIN format (or C6-length) per minute. As is known, the error rate in the separation also increased with a higher throughput. An additional object is to reduce the error rate and to increase the separation certainty. Non-aligned flat items of a stack should be aligned automatically at the alignment wall of the placement station. The base of the mail processing apparatus should be as small as possible. In the placement device of the items processing apparatus, or in the placement station, an alignment of flat items of a stack at the alignment wall should be enabled before or after the separation of flat items of the stack, wherein the flat items may have different dimensions. In particular, mail pieces of a mixed mail stack that are of similar format should be individualized. The placement and separation devices or stations should, however, also be suitable for a different stackable item which exhibits format deviations of up to 20% in height and width.

It has been empirically found that multiple stacked flat items (such as letters and other mail pieces) can no longer be displaced on an alignment or placement wall when some of these flat items of the stack have already been driven into the separation gate, although those items should not yet have been singulated at all. Upon occurrence of such an unwanted malfunction, an alignment is no longer possible or reasonable. Given the stiction between the lowermost flat item and the respective following flat item that is to be singulated, the weight of the stack is to be considered if said lowermost flat item in the stack should first be singulated and the flat items are not standing on edge, but rather are transported lying on their sides. To solve the problem that an alignment of the stack at the alignment wall before the singulation of the respective lowermost item of the stack is impossible given pinched flat items of the stack that have already been driven into the separation gate, in accordance with the invention an edge alignment and singulation for the remaining flat items of the stack is retroactively enabled after the singulation of the respective lowermost flat item in the stack, despite different stack weights.

In accordance with the invention, a placement device is equipped for edge alignment of a stack of flat items with different formats and has at least two transport elements that enable an automatic displacement of the stack transversal to the transport direction and placement of the stack at an alignment wall, as well as a transport of the stack in the transport direction toward the feed deck of a separation device, as well as a displacement of the stack counter to the transport direction. The placement device is used in an items processing apparatus or a placement station. In addition to the placement deck and the placement device, the items processing apparatus also has a feed deck and the separation device, wherein the feed deck has an opening for a separation roller. A portion of the separation device is arranged above the feed deck and, together with the separation roller, forms a main gate of the separation device for the singulation of a stack of flat items. For example, the separation device is used in a feed station. In addition to the known means for separation of the stack, the separation device of the items processing apparatus, or of the feed station, has a movement assembly according to the invention for the movement of a portion of the separation device in a direction counter to the transport direction.

The main gate of the separation device is situated in the intake region of the feed station. The aforementioned portion of the separation device is arranged above the feed deck of the items processing apparatus, or of the feed station, and includes a ramp plate. The movement assembly includes a drive module with an associated movement mechanism to move the aforementioned portion of the separation device in the transport direction x and counter to this.

The placement and separation devices of the items processing apparatus are accommodated in a common housing, or the placement device is arranged in a placement station and the separation device is arranged in a feed station, wherein the placement station and the feed station are respectively accommodated in a separate housing. Furthermore, components are provided to control the alignment state of the transport elements of the placement device or of the placement and separation devices, and to control the movement of a portion of the separation device, wherein the aforementioned portion enables a displacement of the stack counter to the transport direction.

According to a first embodiment, a common control computer is provided to control the placement and separation devices of the items processing apparatus. After it has been loaded into memory of the common control computer, a computer program enables data processing by the common control computer in order to implement a method to control the transport elements of the placement device and a method for singulating mixed mail via the separation device in a predetermined chronological order. The placement and separation devices and the common control unit are arranged in a common housing of the items processing apparatus.

In a second embodiment, control computers are respectively provided in the placement station and the feed station. The control computer of the feed station is connected in terms of communication with the control computer of the placement station. After it has been loaded into memory of the control computer, a first computer program enables data processing by the control computer of the placement station in order to implement a method to control the transport elements of the placement station in a predetermined chronological order. After it has been loaded into memory of its control computer, a second computer program enables data processing by the control computer of the feed station in order to implement a method to singulation of mixed mail via the separation station in a predetermined chronological order. The control computer of the placement station and the control computer of the feed station are respectively accommodated in a separate housing and are connected with one another in terms of communication.

Alternatively, the feed station has only one control computer. After it has been loaded into memory of the common control computer, a computer program enables a data processing by the control computer of the feed station in order to implement a method to control the transport elements of the placement device and a method for singulation of mixed mail via the separation device in a predetermined chronological order. The placement station and the feed station are respectively accommodated in a separate housing and each has an interface. The drive for the transport elements of the placement station is electrically connected with an interface of the placement station and is controlled from the interface of the control computer of the feed station that is connected in terms of communication with the interface of the placement station. The placement station and the feed station, moreover, have sensors (for example photoelectric barriers) to monitor the movement of the stack or of the flat items, and encoders. The sensor and encoder signals of the placement station are polled by the control computer of the feed station via the interfaces.

In the first embodiment, a computer program is provided that—after it has been loaded into a memory of the common control computer—enables data processing via a common control computer of the placement and separation devices of the items processing apparatus so as to control the transport elements of the placement device and to implement the inventive method to singulation of flat items with different formats in a predetermined chronological order via the separation device.

In the second embodiment, a computer program is provided that—after it has been loaded into a memory of the separate control computer of the placement station—enables data processing via a separate control computer of the placement station to control the transport elements of the placement device, and/or—after it has been loaded into memory of the separate control computer of the feed station—to enable data processing via a separate control computer of the feed station to implement the inventive method to i singulation of flat items with different formats in a predetermined chronological order via the separation device.

Furthermore, a computer program is provided that—after it has been loaded into a memory means of the control computer—enables data processing via a separate control computer of the feed station to control the transport elements of the placement device of the placement station and to implement the inventive method to singulation of flat items with different formats in a predetermined chronological order via the separation device of the feed station.

Moreover, a non-transitory computer-readable data storage medium is provided on which program code is stored that—after it has been loaded into a memory of the control computer—enables the separate or the common control computer to control the transport elements of the placement device or placement station and to implement the inventive method to singulation of flat items with different formats in a predetermined chronological order via the separation device or feed station.

Basic method steps to align and singulation of mixed mail are:

a) equip a placement deck of a placement device of the items processing apparatus or of a placement station with means for edge alignment of a stack of flat items with different formats, wherein the aforementioned means comprise at least two transport elements which enable an automatic displacement of the stack transversal to the transport direction and placement of the stack at an alignment wall, as well as a transport of the stack in the transport direction towards the feed deck of the separation device, as well as a displacement of the stack counter to the transport direction.

b) equip an separation device of the items processing apparatus or of the feed station with a movement means to move a portion of the separation device in a direction counter to the transport direction, and c) control the alignment state of the transport elements of the placement device of the items processing apparatus or of the placement station, and control the movement of the aforementioned portion of the separation device of the items processing apparatus or of the feed station, in order to enable a displacement of the stack counter to the transport direction.

After the automatic displacement of the stack transversal to the transport direction and placement of the stack at the alignment wall or placement wall, those flat items of the stack that have already been driven into the singulation gate and that should not yet be singulated at this moment are now also extracted from the gate again via the movement means via a movement of the portion of the separation device in a direction counter to the transport direction. With regard to the edge alignment of the lateral edges, a state of the stack is thereby achieved which is comparable to that which existed before the removal of the lowermost flat item.

BRIEF DESCRIPTION OF THE DRAWINGS

FIG. 3a is a perspective depiction of a placement station in accordance with the invention, above from the front left, with transport elements in a first alignment state after a feed of a flat item on the feed deck.

FIG. 3b is a perspective depiction of a transport element of the placement station in accordance with the invention, above from the front left, in the first alignment state after a feed of a flat item on the feed deck.

FIG. 7a is a front view in a schematic depiction in section of a feed station in accordance with the invention, with a linkage as a component of a movement assembly according to a first embodiment, in a position resulting from a maximum stroke Hmax, and depicts a placement station in accordance with the invention in section with a stack of flat items on a placement deck, in a state during the singulation of the stack and after a movement of the portion of the separation device in a direction counter to the transport direction.

FIG. 7b is a plan view of a portion of the placement deck of the placement station in accordance with the invention, with a stack of flat items on the placement deck, in the same state that was depicted in FIG. 7a.

FIG. 8b is a plan view of a portion of the placement deck of the placement station in accordance with the invention, with a stack of flat items on the placement deck, in the same state which was depicted in FIG. 8a.

FIG. 9a is a front view in a schematic depiction in section of a feed station in accordance with the invention, with the movement assembly in an initial position according to the first embodiment, and depicts a placement station in accordance with the invention in section with a stack of flat items on a placement deck, in a state of an automatic displacement of the stack transverse to the transport direction x.

FIG. 9b is plan view of a portion of the placement deck of the placement station in accordance with the invention, with a stack of flat items on the placement deck, in the state of an automatic displacement of the stack transverse to the transport direction x.

DESCRIPTION OF THE PREFERRED EMBODIMENTS

Figure 1:
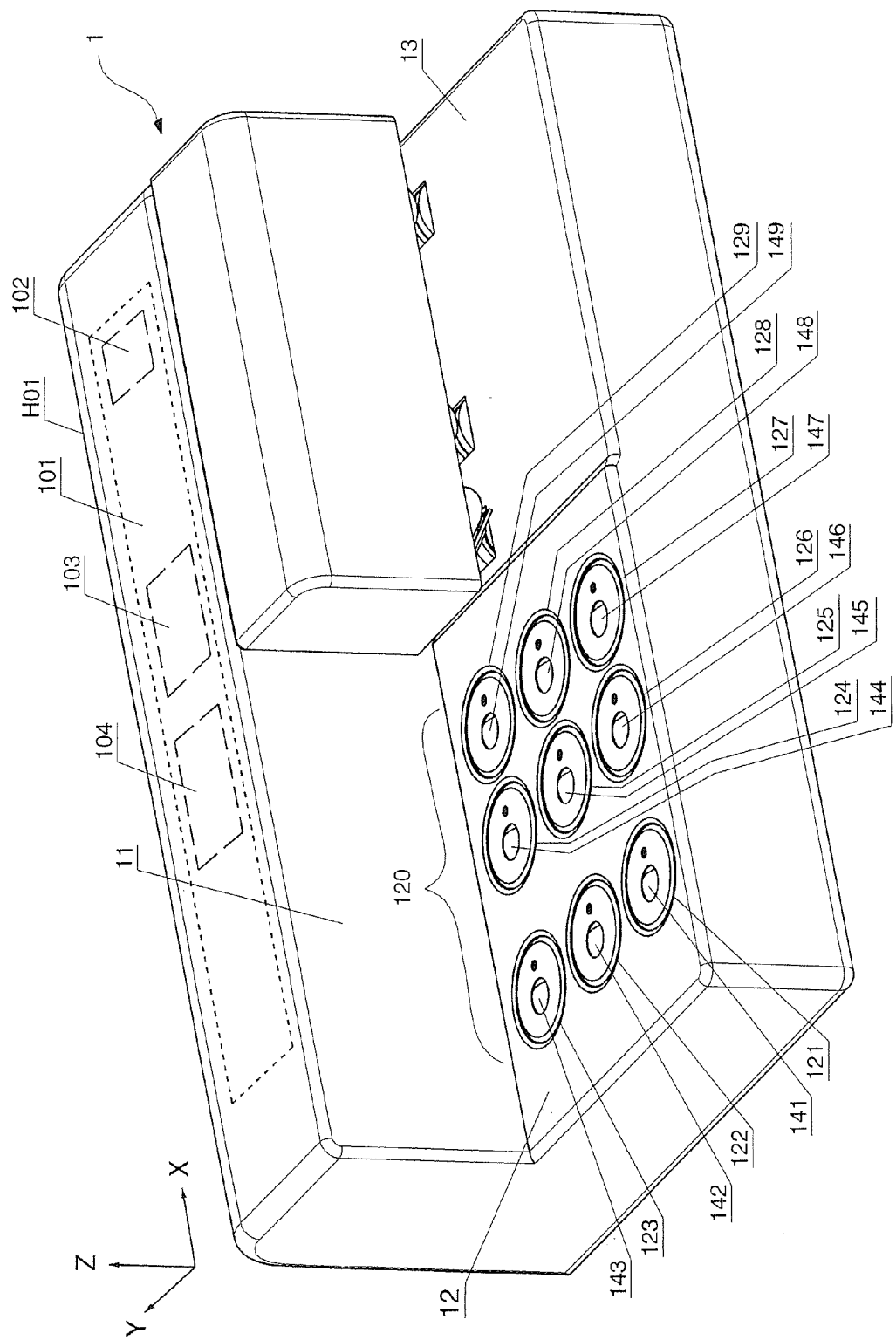
FIG. 1 is a perspective depiction of an items processing apparatus for the placement and supply of flat items in accordance with the invention, above from the front left.

FIG. 1 is a perspective depiction of an items processing apparatus 1 for the placement and supply of flat items, above from the front left. A number of circular openings 121, . . . , 12x in a placement deck 12, respectively for a number of transport elements 141, . . . , 14x, are integrated into a placement and alignment region. Nine transport elements 141, . . . , 149 are preferably provided, which are arranged within a transport field 120 in the openings 121, . . . , 129 of the placement deck 12. The transport field 120 is situated in the x/y-plane of a Cartesian coordinate system. The placement deck 12 is bounded in the y-direction by an alignment wall 11 that extends upwardly from the x/y-plane of the placement deck 12, in the z-direction of the Cartesian coordinate system. The base of the mail processing apparatus is small due to the small size of the placement deck 12. Due to the alignable transport elements within the transport field 120, the placement deck 12 advantageously has a smaller support surface than the largest individual format of the flat items that are to be processed. The dimensions of the transport field 120 of the placement deck 120 correspond to the B4 letter format, for example. The placement deck 12 is situated upstream of a feed deck 13. In this first embodiment, the items processing apparatus 1 is accommodated in a common housing H01 and has a common control computer 101, with at least one processor 104 and with memory 103 to store a computer program. The items processing apparatus 1 has an interface 102 and sensors (not shown) to monitor the movement of the stack, or encoders to monitor the transport of the flat items. The common control computer receives and evaluates 101, the sensor and encoder signals, and generates control signals that are sent to the drive motors. The interface 102 allows (in a manner not shown) a communication connection with a corresponding interface of an items processing apparatus (a franking machine, for example) arranged following in the transport path in the transport direction x, so information, sensor signals and/or control instructions may be exchanged via the interface 102 with the items processing apparatus that is downstream in the transport path.

Alternatively, the items processing apparatus 1 may have a placement station 10 and a feed station 20.

Figure 2:
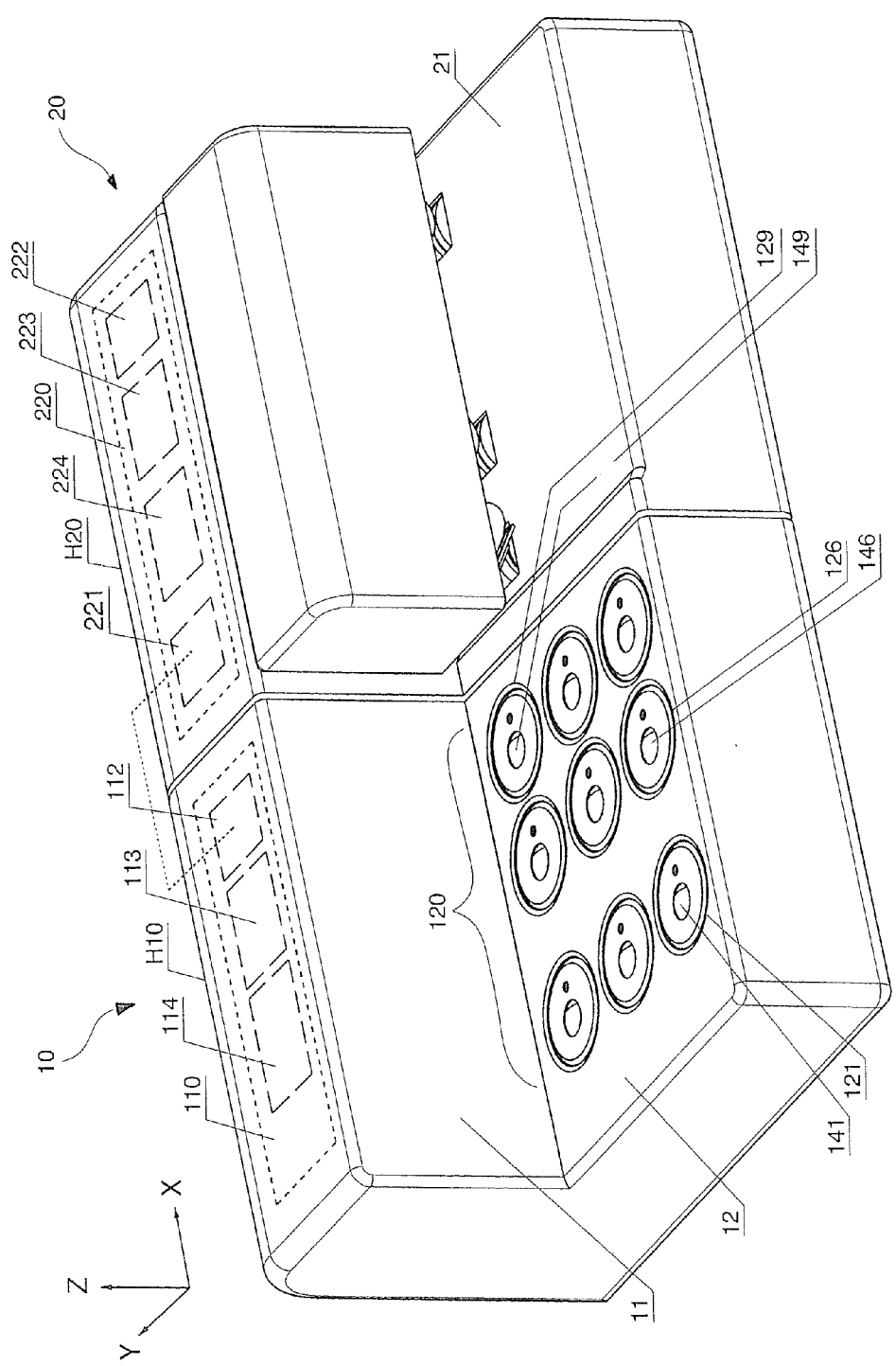
FIG. 2 is a perspective depiction of a placement station that is arranged upstream of a feed station in accordance with the invention, above from the front left.

FIG. 2 is a perspective depiction of a placement station 10 that is arranged upstream of a feed station 20, above and from the front left. Multiple (again nine in this example) transport elements 141-149 are arranged in the transport field 120 of the placement deck 12, in the placement and alignment region of the placement station 10. The placement deck 12 is likewise bounded by an alignment wall 11 in the y-direction and is situated upstream of a feed deck 21 of the feed station 20. In this second embodiment, each station 10 or 20 is accommodated in a separate housing H10 or H20, and each separate control computer 110 or 220 is provided in the placement station 10 or feed station 20. Each separate control computer 110 or 220 is equipped with at least one processor 114 or 224 and with a memory 113 or 223 to store a computer program. An interface 221 of the control computer 220 of the feed station 20 is connected in terms of communication (dotted line) with an interface 112 of the control computer 110 of the placement station 10. For example, the power supply unit and the electronics, including a circuit board of the control computer 110 and interface 112, may be arranged in the intervening space between the alignment wall 11 and the rear wall of the housing H10 of the placement station 10. The drive and associated mechanism for bearing alignment of the transport elements are arranged in the intervening space between the placement deck 12 and a base plate (not shown) of the placement station 10, and installed on a chassis or support. An interface 222 serves for communication connection with a subsequent items processing station.

In a third (alternative) embodiment (not shown), only the feed station needs to have a control computer. The placement station and the feed station are each equipped with an interface. The drive of the transport elements of the placement station is controlled from the control computer of the feed station via the interface, and the sensor and encoder signals of the placement station are polled by the control computer via the interface. The placement station and the feed station moreover have sensors to monitor the movement of the stack or of the flat items via the control unit of the feed station.

Upon singulation, the respective lowermost flat item of the stack is transported away from the stack in the transport direction by the placement and feed station, or in a known manner by the feed station. The controlling of the movement mechanism of the placement and feed station, or of the feed station, for the movement of the aforementioned portion of the separation device in a direction counter to the transport direction, takes place either via a common control computer or a control computer of the feed station that belongs separately to the feed station.

FIG. 3a is a perspective depiction of a placement station 10 from the front and top left. After the feed of a flat item P on the placement deck 12, the flat item P is brought into a placed state at the alignment wall 11. For this purpose, the placement station 10 is equipped with at least two transport elements 141 and 149 for automatic displacement of the item P, or of a stack (not shown), transverse to the transport direction x, and for placement of a lateral edge of the item P, or of the lateral edge of one of the flat items of the stack, at the alignment wall 11. The transport elements project through associated circular openings 121 and 129 (as shown in FIG. 2) in the placement deck 12 of the placement station 10, such that they come into frictional contact with the underside of the flat item P or with the lowermost flat item P of a fed stack. For automatic displacement of the stack transverse to the transport direction x, the transport elements were brought in advance into a first alignment state. According to the example of FIG. 3a, nine transport elements that are arranged in a transport field are provided. To drive the transport elements, a motor and an associated mechanism are provided and arranged (in a manner not shown) below the placement deck 12. By operation of this drive, the transport elements are controlled and driven jointly by a control computer. The drive preferably has a VDC motor (not shown) arranged below the placement deck 12, which is controlled by the control computer at a predetermined rotation speed as of a predetermined point in time. In the state during the placement of a flat item on the feed deck, the rotation axis 1400 of each transport element is aligned parallel to the x-direction of the Cartesian coordinate system, thus in the transport direction. Each transport element thus acts on a flat item transverse to the transport direction x, thus in the y-direction.

A stepper motor (not shown) that is likewise controlled by the control computer and an associated positional alignment mechanism (not shown) are provided in order to rotate the rotation axis of the transport elements as necessary into different position as may be needed. The transport elements are thereby brought into a second alignment state in order to enable an automatic displacement of the flat item at an angle relative to the transport direction x. The cost of associated mechanisms can be reduced by all transport elements being equipped with a VDC motor and stepper motor.

FIG. 3b is a perspective depiction of a transport element 14x of the placement station in the first alignment state, from the front and above left. The transport element is formed by a drum-shaped rubber roller 1402 with a greatest diameter at the drum equator 1403, and the rubber roller 1402 is attached asymmetrically on both sides of the drum equator 1403 to a molded rotation body 1401, such that a wider running face 14021 of the drum-shaped rubber roller 1402 is formed on one side of the drum equator than on the other side. On the aforementioned other side, the molded rotation body has a lateral running face 14012 that extends on one side up to the drum floor, and that on the other side terminates flush with the less wide running face 14022 of the drum-shaped rubber roller 1402. The lateral running face 14012 of the molded rotation body has a much smaller coefficient of friction than the running face 14021 of the rubber roller. FIG. 3b shows a rotation of a rotation axis of the molded rotation body by an angle of 0° relative to the transport direction x. The force of friction Fy of the drum-shaped rubber roller 1402 rotated in the rotation direction therefore acts in the y-direction. The drum-shaped rubber roller in the placement station is used to automatically displace the stack transverse to the transport direction and placement of the stack at the alignment wall 11 or placement wall. The description associated with FIGS. 7a and 7b explains in detail the special function of the lateral running face of the molded rotation body with the much smaller coefficient of friction.

Figure 4A:
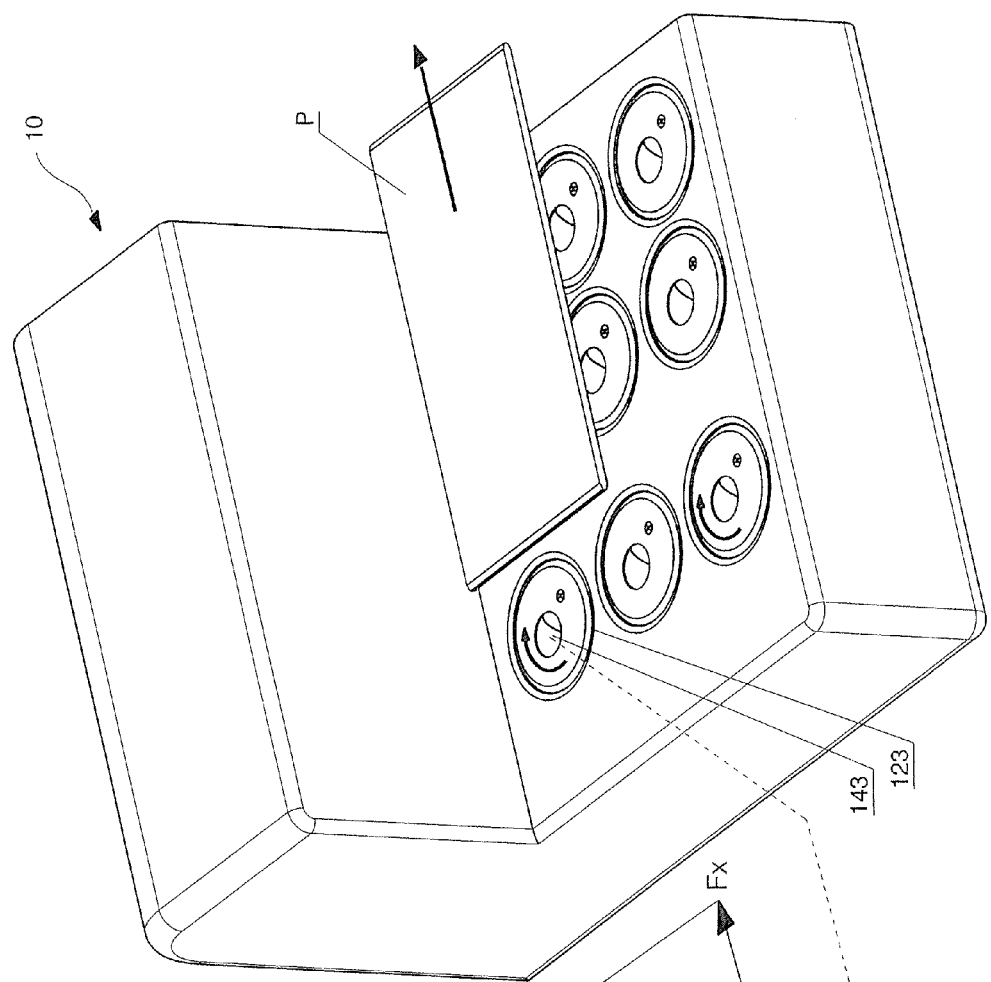
FIG. 4a is a perspective depiction of the placement station in accordance with the invention, above from the front left, with transport elements in a second alignment state after an edge alignment of the flat item.

FIG. 4a is a perspective depiction of a placement station 10 from the front and top left. After an edge alignment of the flat item P, the transport elements were brought into the second alignment state. This causes transport of the flat item in the transport direction x while maintaining the alignment of the flat item. The circular openings of the placement deck of the placement station may be arranged in series or in an arbitrary pattern before the alignment wall. The transport elements 141 . . . 149 are supported in a chassis or support (not shown) and project through the circular openings 121 . . . 129. The transport elements were rotated by a mechanism (not shown) below the placement deck of a drive motor (not shown) into the required position for the purposes of edge alignment, which also enables a propulsion in the transport direction x while maintaining an optimal alignment of the flat item. The drive motor is controlled by the control computer in order to rotate the transport elements together into the required direction by means of the mechanism. The control unit regulates, at a predetermined point in time, the velocity and the rotation angle with which the mechanism displaces the transport elements.

Figure 4B:
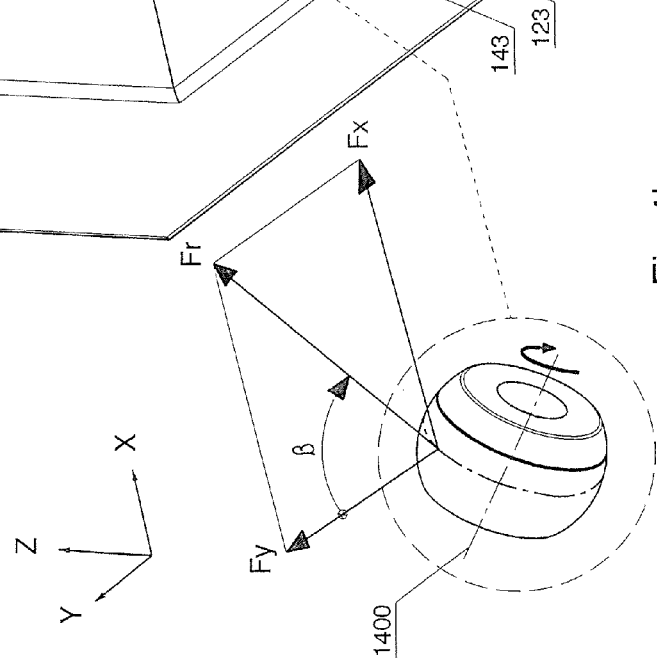
FIG. 4b is a perspective depiction of a transport element of the placement station in accordance with the invention, above from the front left, in a second alignment state after an edge alignment of the flat item.

FIG. 4b is a perspective depiction of a transport element 143 of the placement station from the front and top left, in the second alignment state that the transport element has after an edge alignment of the flat item to achieve a specific transport state. By a rotation of the rotation axis 1400 of the transport element 143 by an angle of −β relative to the transport direction x, a resulting friction force Fr of the drum-shaped rubber roller exists in a direction of action at an angle of 90°−β relative to the transport direction x, after the transport element 143 (supported or mounted such that it can rotate within the circular opening 123) has been rotated in the desired direction of action. A friction force component Fx of the drum-shaped rubber roller additionally acts in the x-direction, and a friction force component Fy of the drum-shaped rubber roller additionally acts in the y-direction. The resulting friction force component Fr is situated at the equator of the drum-shaped rubber roller at an angle of −β relative to the y-direction.

Figure 5A:
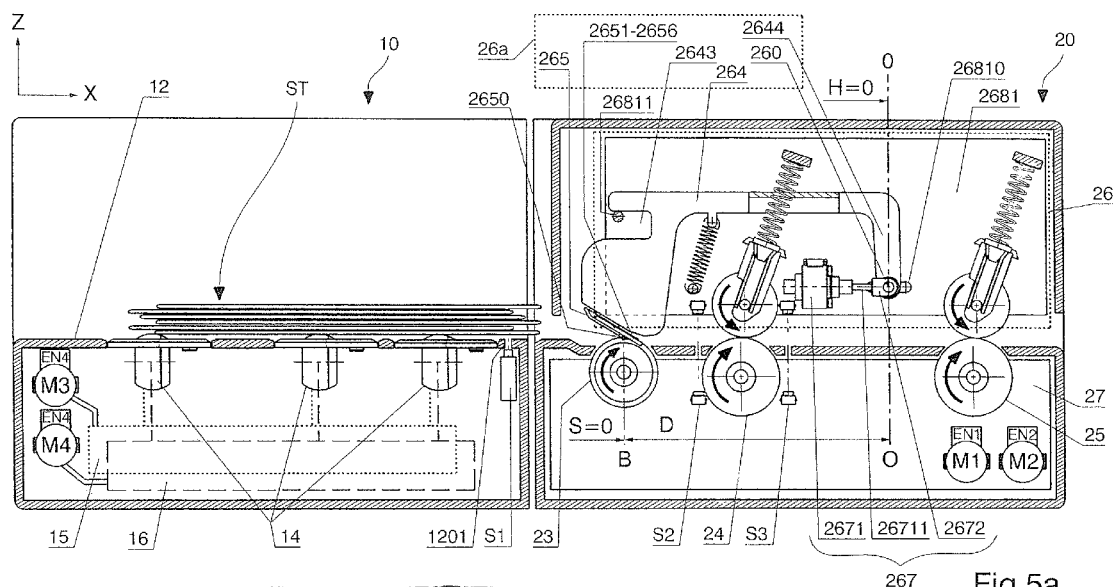
FIG. 5a is a front view in a schematic depiction in section of a feed station in accordance with the invention, with a linkage as a component of a movement assembly in an initial position according to a first embodiment, and depicts a placement station in accordance with the invention in section that is arranged upstream of the feed station, with transport elements in the first alignment state, and with a stack of flat items on a placement deck in a state before an singulation of the stack.

FIG. 5a is a front view of a schematic depiction in section of a feed station 20 with a linkage as a component of a movement mechanism in an initial position according to a first embodiment, and depicts, in section, a placement station 10 that is arranged upstream of the feed station, with a stack ST of flat items on a placement deck 12 with a first alignment state of the transport elements before singulation of the stack. The movement assembly is formed by a movement mechanism 26a of the separation device and a drive module 267. The movement mechanism 26a serves for the movement of a ramp plate 265 of a modified linkage 264 of the feed station 20 in the transport direction x and counter to the x-direction. The movement mechanism 26a has at least the components 260, 264, 2643, 2644, 265 and 2651-2655 described below, and is directed by a guide mechanism provided in the contact pressure box.

A separation roller 23 of the main gate is driven by a first motor M1 via a suitable mechanism (not shown) installed on a frame 27. A driven first transport roller 24 and a driven second transport roller 25, which is arranged downstream in terms of the mail flow, are driven by a second motor M2 via a suitable mechanism (not shown) installed on the frame 27. A sensor S2 is arranged upstream and a sensor S3 is arranged downstream of the first transport roller 24, orthogonal to the transport path. Encoder wheels for a first encoder EN1 and second encoder EN2 are installed on the motor shafts of the motors M1 and M2. At least the sensors S2, S3, the encoders EN1, EN2 and the motors M1, M2 are connected electrically in a known manner with the control computer (not shown in FIG. 5a) for polling and activation thereof. More details in this regard are provided in German utility patent DE 20 2012 011 877 U.

The differences in operation from the known assembly result due to the aforementioned movement assembly, which includes the aforementioned drive module 267, being inventively controlled by the control computer, for which purpose the drive module 267 is electrically connected with the control computer. An additional sensor (not shown) for monitoring the overall movement of the movement assembly may be provided if desired, and be electrically connected with the control computer.

A recess 2643 is formed in the upper portion of the head of the linkage 264 in the separation region and in the vertical clearance above the gap. The recess 2643 is—in the state shown in FIG. 5a—bounded in the z-direction by an approximately horizontal plane that is situated parallel to the feed deck and serves to guide the linkage.

The recess 2643 comes to a stop when an edge thereof encounters a first stop element 26811. A second stop element (not shown) is installed at a side wall of the contact pressure box 26, just like the first stop element 26811. The stop element 26811 and the other stop element are installed at the contact pressure box 26 so as to damp oscillations, and each formed by a metal pin or an elbow that is designed in order to absorb an excessively hard a stop, for example with rubber buffers.

The feed deck is situated parallel to the x/y-plane. The approximately horizontal plane of the recess 2643 limits the downward movement of the linkage 264 (and therefore of the selection fingers 2651-2656), but allows a movement of the linkage in the transport direction x and counter thereto.

The rotation axis of the linkage 264 proceeds in a downstreamly-directed portion of the contact pressure box 26 and proceeds through the center of the circle of a rotation axis shaft 260 which is installed so as to be able to rotate with a downstream-directed end 2644 of the linkage. The rotation axis shaft 260 is aligned parallel to the y-direction and is likewise guided so as to be displaceable in the transport direction x, and counter thereto, in an elongated hole 26810 of a side wall 2681 of the contact pressure box 26. The separation roller 23 has a rotation axis whose circle center is situated orthogonal to a waypoint B and can be mapped to the transport path. A reference point 2650 on the ramp plate edge is situated orthogonally opposite the waypoint B.

The circle center of the rotation axis shaft 260 is situated orthogonal to a waypoint O on the transport path, wherein the circle center is situated at a zero point 0 at which the rotation axis shaft 260 is exposed to a stroke H=0. The waypoint O is situated at a distance D from the waypoint B in the transport direction x. The linkage 264 of the contact pressure box, which linkage 264 is modified in such a manner, is suitable as a movement means of the feed station, wherein the contact pressure box 26 is equipped with a drive module 267 and with associated mechanisms for displacement of the rotation axis of the linkage. In a first embodiment, the drive module 267 is designed as a linear stepper motor 2671 with a linearly movable drive rod 26711 whose end is connected with an adapter piece 2672. The rotation axis shaft 260 is guided on one side into the elongated hole 26810 of the side wall 2681 and on the other side (not shown) into an elongated hole 26820 of an oppositely situated side wall 2682, wherein the side walls may be arranged inside the contact pressure box 26. The end 2644 of the linkage 264 that is directed downstream is supported such that it can rotate around the rotation axis shaft 260. At the same time, the rotation axis shaft 260 is positively connected with the adapter piece 2672 so that the linkage may be moved in the transport direction, and counter thereto, with a predetermined stroke. The gap between the separation roller 23 and the ramp plate 265 to which the separation fingers 2651-2656 are attached occurs at the point B of the transport path and is minimal when the linear stepper motor 2671 has been driven into a rest position and no flat item has entered into the gap again. In the rest position, the linearly movable drive rod 26711 is fully extended in the transport direction x.

As an alternative to the linear stepper motor, other means (not shown) such as lifting magnets or a servomotor are also suitable as a drive module to displace the rotation axis shaft 260 of the linkage.

The transport elements 14 of the placement station 10 are aligned in their respective positions by a third motor M3 and driven by a fourth motor M4 in order to move the flat item, wherein both motors M3 and M4 are arranged with an associated mechanism 15 and 16 below the placement deck 12 of the placement station 10 and are installed (the manner is not shown) on a chassis of the placement station 10. At least one first sensor S1 is installed in an opening 1201 below the placement deck 12, downstream of the transport elements. Encoder wheels for a third encoder EN3 and fourth encoder EN4 are likewise installed (the manner is schematically shown) on the motor shafts of the motors M3 and M4. For their control, at least the first sensor S1, the encoders EN3, EN4 and the motors M3, M4 are electrically connected in a known manner (which is not shown) with a control unit (the known manner is not shown) for their polling.

Figure 5B:
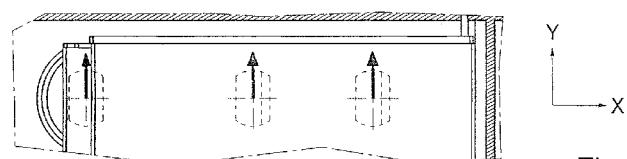
FIG. 5b is a plan view of a portion of the placement deck of the placement station in accordance with the invention, with transport elements in the first alignment state and with a stack of flat items on the placement deck in the state before a singulation of the stack.

FIG. 5b is a plan view of a portion of the placement deck of the placement station, with a stack of flat items on the placement deck in the first alignment state of the transport elements before singulation of the stack.

Figure 6A:
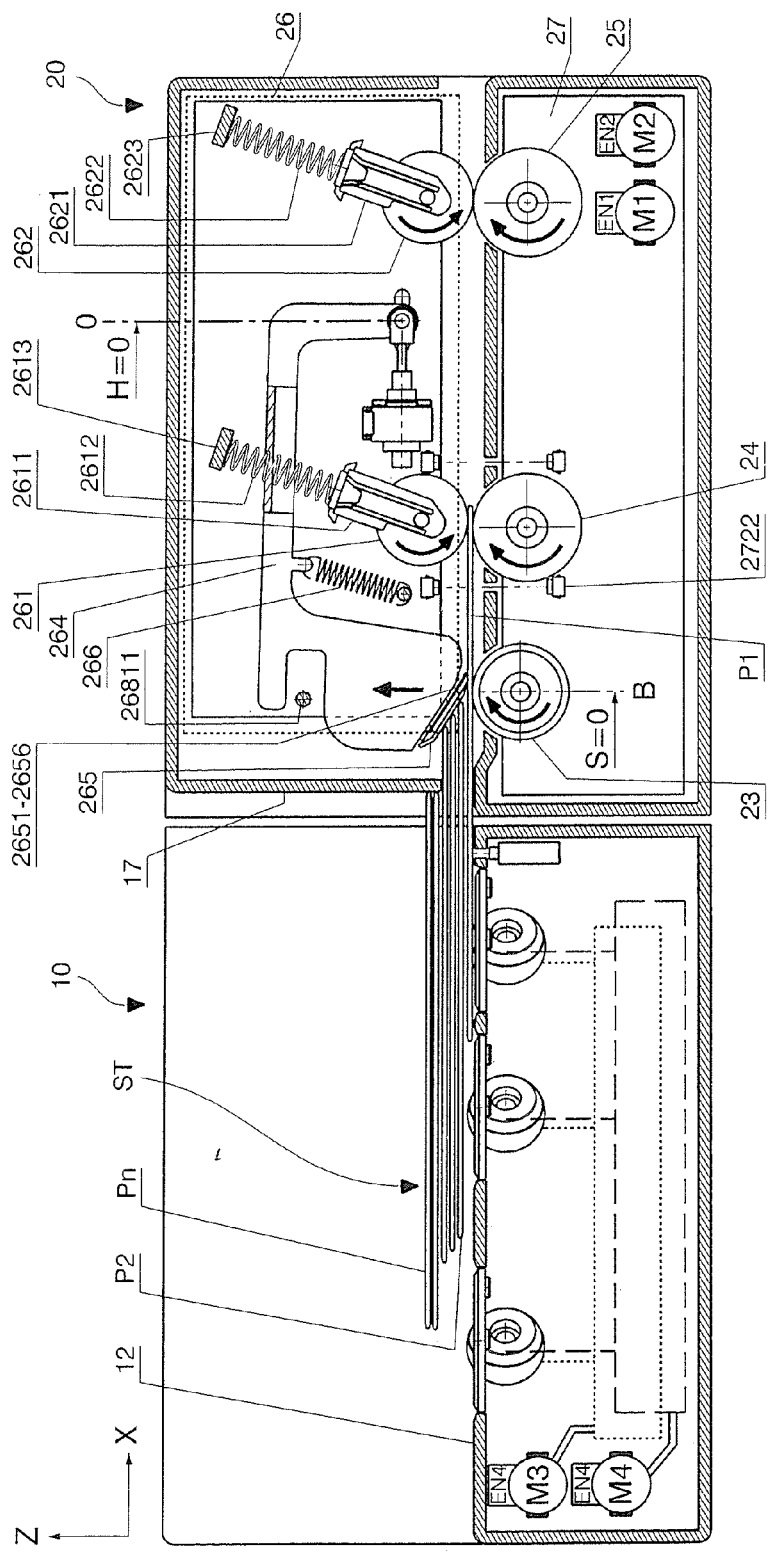
FIG. 6a is a front view in a schematic depiction in section of a feed station in accordance with the invention, with a linkage as a component of a movement assembly in an initial position according to the first variant, and depicts a placement station in accordance with the invention in section that is arranged upstream of the feed station, with transport elements in the second alignment state, and with a stack of flat items on a placement deck after an edge alignment and in a state during an singulation of the stack.

FIG. 6a is a front view of a schematic depiction in section of the feed station 20 with a linkage 264 as a component of a movement means in the initial position according to the first variant, and schematic depiction in section of the placement station 10 that is arranged upstream of the feed station 20. In the initial position, the linkage 264 is exposed to a stroke H=0. A stack ST of flat items is shown placed on the placement deck 12 of the placement station 10, which stack now arrives—after an edge alignment of its one lateral edge, after an alteration of the alignment of the transport elements into the second alignment state—in a position in order to be able to be singularized. The singulation of the stack is a function (known from German utility patent DE 20 2012 011 877 U1) of a first separation roller whose function, according to the invention, is now adopted by the transport elements of the placement station, such that the first separation roller of the feed station according to German utility patent DE 20 2012 011 877 U1 may now be omitted entirely.

The upper portion of the stack ST is held back by the mail intake-side wall 17 of the upper housing part of the feed station 20, while the lower portion of the stack ST arranges at the main gate in which the lowermost flat item P1 of the flat items P2-Pn of the stack ST is drawn in. A photoelectric barrier 2722 (FIG. 6a) is used as a second sensor S2 (FIG. 5a), for example. The leading edge of the flat item P1 interrupts a light beam of the photoelectric barrier 2722. The sensor signal is evaluated by a control unit (the manner is known in principle from DE 202012011877 U1 but not shown in FIG. 6a), for example in order to establish the position of the flat item P1. The preliminary gate is preferably designed with multiple stages. A stack stop surface is provided (the manner is known from DE 202012011877 U1 but not shown in FIG. 6a) before and above the gap of the main gate at the pre-separation plate. The pre-separation plate is attached (the manner is not shown) to the frame 27. At least one pre-separation finger is attached (the manner is not shown) at the pre-separation plate, which is likewise known from DE 202012011877 U1. The stack stop surface of the pre-separation plate should prevent the entry of multiple thin flat items into the gap. Given an entry of the lowermost flat item of the plurality of thin flat items of the stack into the gap, the linkage is raised—counter to an elastic force of a tension spring 266—only by an amount in the z-direction (black arrow) that is sufficient in order to pass the one flat item P1 to be singularized at the base of the stack through the gap of the main gate. At least the next one flat item P2 that is to be singularized is held back at the ramp plate 265. If necessary, a few of the multiple thin flat items are held back in the event that this cannot already be prevented by the flexible pre-separation fingers (not shown). The ramp plate 265 (arranged following downstream at the head of the linkage) to which the flexible separation fingers 2651-2654 are also attached forms—together with the separation roller 23 (known from DE 202012011877 U1) the main gate.

The stop element 26811 is attached to the contact pressure box 26. The tensile force required to stop the linkage 264 is applied by a tension spring 266 that is installed on one side within the contact pressure box 26 and on the other side at the linkage 264. An undriven first contact pressure roller 261 of the contact pressure box 26 is arranged between the two legs of a first rocker 2611. Mounted at the middle of the rocker 2611 is a first compression spring 2612 that is supported at a first contact pressure box bulkhead 2613 within the contact pressure box 26, which bulkhead 2613 is arranged in the upper portion of the contact pressure box 26. The undriven first contact pressure roller 261 arranged at the rocker 2611 is situated opposite the driven first transport roller 24. The contact pressure box 26 has downstream an undriven second contact pressure roller 262. It is installed in the same way as shown on a rocker 2621. A second compression spring 2622 that is installed between a second rocker 2621 and a second contact pressure box bulkhead 2623 within the contact pressure box 26 ensures that the second contact pressure roller 262 is also likewise arranged spring-mounted in the contact pressure box 26. The second contact pressure roller 262 is situated opposite the driven second transport roller 25. The separation roller 23 and transport rollers 24 and 25 are arranged (in a manner not shown in FIG. 6a) between a front frame wall and the rear frame wall of the frame 27.

Figure 6B:
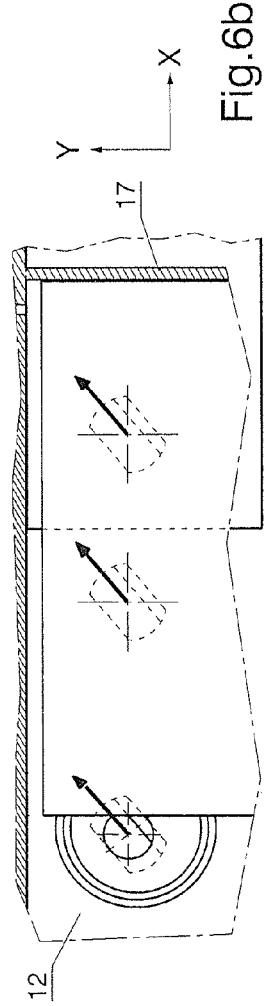
FIG. 6b is a plan view of a portion of the placement deck of the placement station in accordance with the invention, with transport elements in the second alignment state and with a stack of flat items on the placement deck after an edge alignment of the stack.

FIG. 6b is a plan view of a portion of the placement deck of the placement station, with transport elements in the second alignment state and with a stack of flat items on the placement deck 12 after an edge alignment of the stack and after a further transport of the stack in the transport direction x. As a result of the further transport, the upper portion of the stack already rests on the main intake-side housing wall 17 of the feed station. An entrance of multiple thin, flat items into the feed station up until the gap is not drawn, however. The alignment state of the transport elements corresponds to that which was already depicted in FIGS. 4a and 4b.

FIG. 7a is a front view of a schematic depiction in section of a feed station 20 with a linkage 264 as a component of a movement assembly according to the first embodiment in a position given maximum stroke Hmax, and a schematic depiction in section of the placement station 10 that is arranged upstream of the feed station. The transport elements are in the first alignment state and therefore prevent a further transport of the stack in the transport direction x. However, the one flat item P1 to the singularized at the base of the stack ST may continue to be singularized and transported in the transport direction x.

The linkage 264 of the feed station 20 has been displaced counter to the transport direction x. The circle center point of the rotation axis shaft 260 is now situated orthogonal to a waypoint N on the transport path. A distance C now lies between the waypoint B and the waypoint N, wherein C<D. The distance D arises from FIG. 5a. A reference point 2650 on the lateral edge of the ramp plate 265 is now situated orthogonally opposite a waypoint I, which is upstream of the waypoint B on the transport path. A displacement distance Smax results from the difference of the distances D−C, or from the distance of the waypoints I and B. It is shown how the thin, flat items of the stack ST that are held back are prevented from entering into the gap due to the movement of the linkage counter to the transport direction x, since the separation roller is no longer in contact with the stack. The drive means 267 may be comprised of a linear stepper motor or of alternative means (not shown) with are connected in terms of control with the control computer (not shown), which controls a displacement of the linkage (and therefore of the upper portion of the main gate) by the displacement distance Smax of approximately 10 mm counter to the transport direction x when the correct point in time has been reached. The stack ST of flat items resting on the placement deck 12 is drawn in a state in which it has been slid back after a movement of the portion of the separation device in a direction counter to the transport direction x, whereas the lowermost thin item P1 of the stack ST has been further singularized. A linear stepper motor with a linearly movable drive rod that—in the withdrawn state (black arrow)—supplies a maximum stroke Hmax is depicted as a drive means 267. The correct point in time for a maximum stroke Hmax to displace the linkage 264 has arrived when the one flat item P1 that is to be individualized at the base of the stack ST has already passed multiple millimeters through the gap of the main gate, and the leading edge of the flat item reaches a photoelectric barrier 2723 of the third sensor S3 (FIG. 5a). Given a transmitted light barrier, the leading edge of the flat item interrupts the light barrier, which is established in the control unit upon evaluation of the sensor signal. In preparation for the displacement of the stack into the state in which it is slid back, the first alignment state of the transport elements of the placement station—in which the direction of the rotation axis of the molded rotation body coincides with the transport direction x—must be achieved or reestablished, whereby a displacement of the stack counter to the transport direction x is enabled. The lateral running face of the molded rotation body of the transport elements is thereby brought into a position downstream of the drum-shaped rubber roller 1402. The lateral running face of the molded rotation body is situated downstream in the transport direction x and has a much smaller coefficient of friction. A smaller force is necessary for the displacement of the stack counter to the transport direction because, upon running onto the lateral running face of a molded rotation body—the lowermost mail piece may slide over its surface. The first alignment state of the transport elements that is required for this corresponds to that which was already depicted in FIGS. 1 through 3b.

FIG. 7b is plan view of a portion of the placement deck of the placement station, with a stack of flat items on the placement deck, in the same state which was depicted in FIG. 7a. The transport elements are depicted in the first alignment state. The stack ST of flat items on the placement deck 12 is located in a state for singulation of the lowermost flat item P1 of the stack. However, the upper portion of the stack now no longer rests on the mail intake-side housing wall 17 of the feed station since the stack has been slid back, counter to the transport direction x.

Figure 8A:
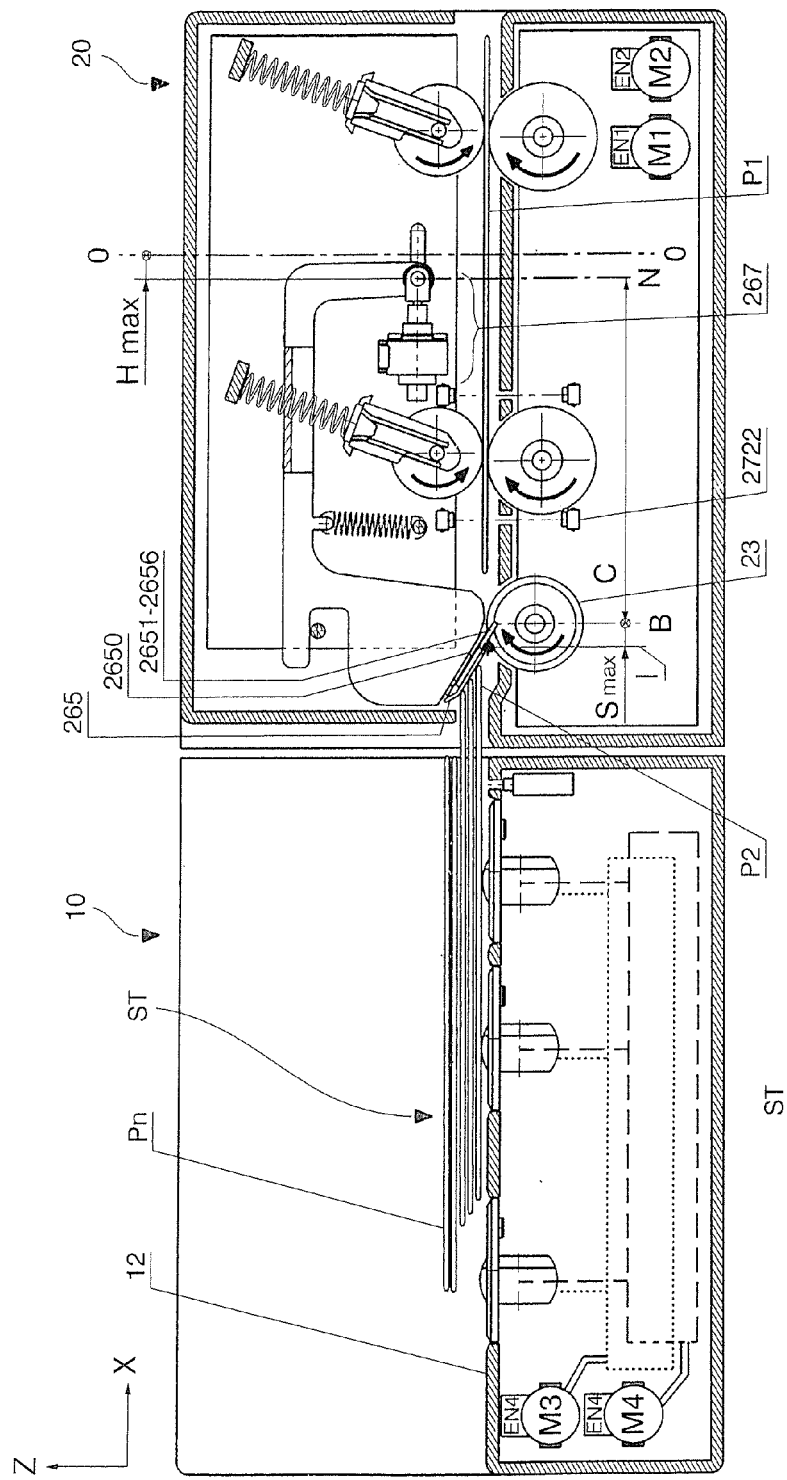
FIG. 8a is a front view in a schematic depiction in section of a feed station in accordance with the invention, with the movement assembly according to the first embodiment resulting from a maximum stroke Hmax, and depicts a placement station in accordance with the invention in section with a stack of flat items on a placement deck, in a state of an automatic displacement of the stack before a singulation of an additional flat item of the stack.

FIG. 8a is a front view of a schematic depiction in section of a feed station 20 with a linkage 264 as a component of a movement assembly according to the first variant given maximum stroke Hmax, and a depiction in section of a placement station 10 that is arranged upstream of the feed station, with transport elements in the first alignment state. In the first alignment state, the transport elements prevent a further transport of the stack on the placement deck 12 in the transport direction x. A lowermost flat item P1 resting on the floor has been separated from the stack of flat items on the placement deck and has been driven downstream completely out of the main gate. The linkage 264 is a displaceable part of the separation device, and the separation roller 23 is a different, non-displaceable part of the separation device. The displacement movement of the movement assembly by the displacement distance Smax is caused by the stroke Hmax of the drive means 267. The reference point 2650 on the lateral edge of the ramp plate 265 is now situated orthogonally opposite a waypoint I, which is upstream of the waypoint B on the transport path. Due to the movement of the displaceable portion of the separation device in a direction counter to the transport direction x, the stack P2-Pn of flat items on the placement deck 12 is also slid back by the displacement distance Smax and is brought into a state similar to as before an singulation of a flat item of the stack, which corresponds to the initial state of the flat item that was depicted in FIGS. 3a and 3b. The leading edge of a shown additional flat item P2 of the stack ST was slid out of the gap of the main gate again. The main gate is comprised of the separation roller 23 and the flexible separation fingers 2651-2654 that are installed on the ramp plate 265. A trailing edge of the flat item P1 clears a light beam of the first photoelectric barrier 2722 again when the singulated flat item P1 at the base of the stack ST has already left the gap of the main gate by multiple millimeters. It is provided that the separation device has a separation roller 23, and that the movement of the portion of the separation device counter to the x-direction takes place in a displacement region that amounts to at least 20%-100% of the radius of the separation roller 23. The maximum displacement is preferably at least half as large as the radius of the separation roller 23.

Figure 8B:
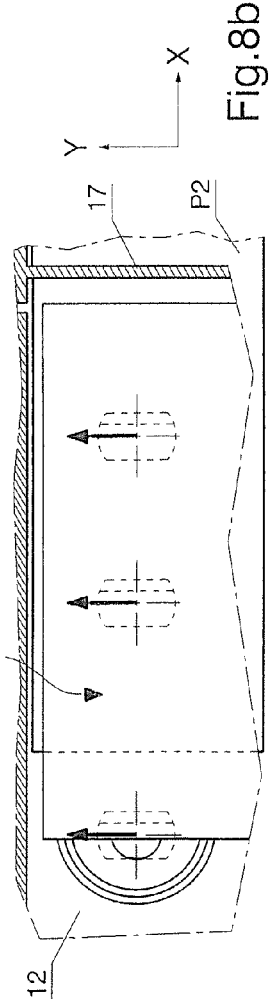

FIG. 8b is a plan view of a portion of the placement deck of the placement station, with a stack ST of flat items on the placement deck 12, in the same state which was depicted in FIG. 8a. After the singulation of a flat item of the stack, the upper portion of the stack was slid in a direction counter to the transport direction x, back onto the placement deck 12, due to a movement of the displaceable portion of the separation device. The upper portion of the stack therefore no longer rests on the mail intake-side housing wall 17 of the feed station. The next flat item P2 to be individualized is situated with its trailing edge at the base of the stack on the placement deck 12. The leading edge of the flat item P2, and possibly of additional flat items of the lower portion of the stack ST, was slid out of the gap of the main gate again. However, the next flat item P2 still protrudes with its leading edge into the intake region of the feed station, but not to the separation roller 23 of the gate. The transport elements are depicted in the first alignment state and in dashed lines since these are provided below the stack of flat items. The first alignment state of the transport elements exists during the automatic displacement of the stack, before a new separation of an additional flat item of the stack is triggered, and is comparable to the first alignment state according to FIGS. 3a, 3b, 5a and 5b.

FIG. 9a is a front view of a schematic depiction in section of a feed station 20 with a linkage 264 as a component of a movement assembly in an initial position according to the first variant, and depiction in section of a placement station 10 that is arranged upstream of the feed station 20, with transport elements in a first alignment state and with a stack ST of flat items on a placement deck 12, in a state of an automatic displacement of the stack transversal to the transport direction x. After an automatic displacement of the stack counter to the transport direction x and transverse displacement of the stack, a state is achieved that is similar to after an automatic displacement of the stack transverse to the transport direction x according to FIGS. 3a, 3b, 5a and 5b. The leading edge of the flat item P2, and possibly of additional flat items of the lower portion of the stack ST, was slid out of the gap of the main gate again, but these still protrude with the leading edge into the intake region of the feed station. In the initial position of the linkage 264, the stroke H and the displacement distance S are equal to zero. Due to the control computer, the drive module 267 is activated accordingly at a given point in time. The point in time of activation is reached as soon as the trailing edge of the flat item P1 has left the first photoelectric barrier 2722. The light beam of the first photoelectric barrier 2722 is thereby cleared again. The control computer of the feed station polls the first photoelectric barrier 2722 over and over and establishes whether the light beam of the first photoelectric barrier 2722 has been cleared again. An automatic displacement of the stack transversal to the transport direction x is now possible, and a state comparable to that shown in FIG. 5a is established by the control unit.

FIG. 9b is a plan view of a portion of the placement deck of the placement station, with a stack ST of flat items on the placement deck 12 in the state of an automatic displacement of the stack transversal to the transport direction before an singulation of the next flat item P2 of the stack.

Figure 10:
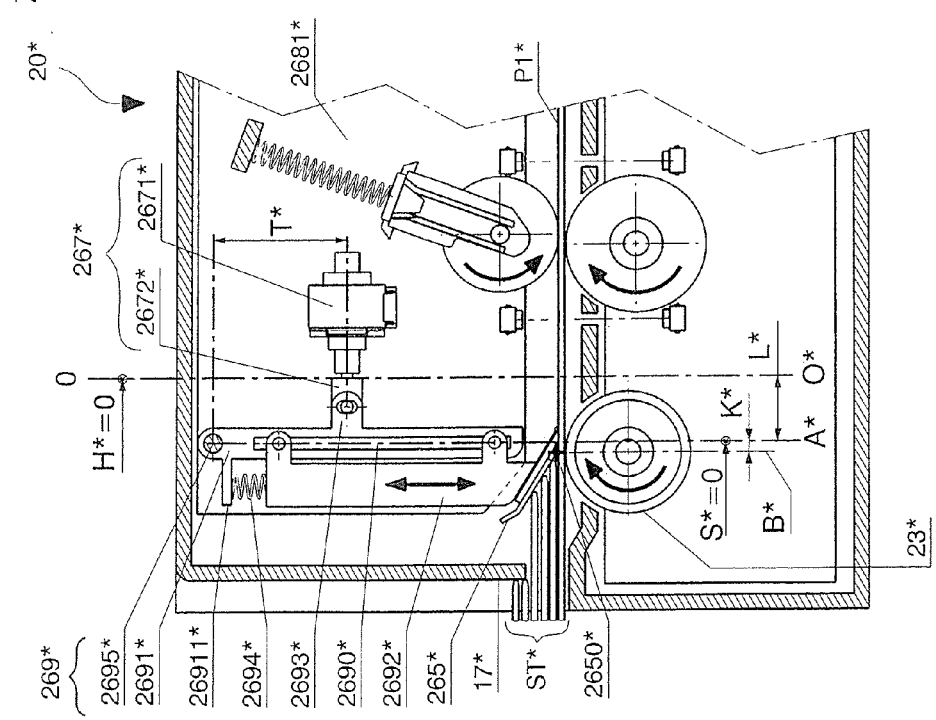
FIG. 10 is front view in a schematic depiction in section of a feed station in accordance with the invention, with a movement assembly according to a second embodiment, in initial position.

FIG. 10 shows a front view of a schematic depiction in section of a feed station 20* with a movement assembly according to a second embodiment, in an initial position. The movement assembly has a drive module 267* with associated movement mechanism 269* for the movement of a ramp plate 265* in the transport direction x and counter to the x-direction. The mechanism is comprised of a pivotable lever arm 2691* with a displaceable head part 2692* which protrudes into the singulation region. The head part 2692* is mounted elastically at the one end of the lever arm, wherein a compression spring 2694* is placed in a bore of the head part 2692* that is supported at a lever arm bend 26911* at the other end of the lever arm. The other end of the lever arm is mechanically connected at a vertical distance (in the z-direction) above the separation gap with a bearing shaft 2695* that is borne so as to be able to rotate at two side walls of the contact pressure box. Of these, only one side wall 2681* is depicted, and an additional side wall 2682* was not shown. The middle point of the bearing shaft 2695*, which is aligned (the manner is not shown) parallel to the y-axis of the Cartesian coordinate system, is designated in the following as a pivot point. In the longitudinal direction of the length of the lever arm, the lever arm 2691* has a guide crank 2690* for the elastically mounted head part 2692*, wherein the ramp plate 265* is installed at the head part 2692*, which ramp plate 265*—together with the separation roller 23*—forms the main gate of the separation device. The separation roller 23* of the main gate has a rotation axis (not shown) whose circle center point is situated orthogonal to a waypoint B* and can be mapped to the transport path. A reference point 2650* on the lateral edge of the ramp plate 265* is situated orthogonally opposite the waypoint B*.

The pivot point of the bearing shaft 2695* of the lever arm 2691* is situated orthogonal to a waypoint A* on the transport path, wherein the waypoint A* has a distance K* from the waypoint B* in the transport direction x. The distance K* is constant, just like a distance L* between the waypoint A* and the waypoint O* which is situated orthogonal to the zero point 0 at which an adapter 2672* is exposed to a stroke of H*=0. The lever arm 2691* forms over its entire length a load arm, wherein the load is located at one end of the lever and the pivot point is located at the other end of the lever. Given a one-sided lever, load arm and power arm are situated on the same side. The power arm has a shorter length than the load arm. The lever arm 2691* has a rotation point of a rotation axis of a bearing shaft at a vertical distance T* from the pivot point. The bearing shaft is a component of an installation segment 2693* that is installed on the lever arm 2691*. The bearing shaft is arranged so as to be movable in an elongated hole of the installation segment. The elongated hole is arranged parallel to the guide crank 2690*.

As an alternative to the elongated hole, a coupling rod (not shown) may be used, or the bearing shaft is a component of a second type of installation segment that is installed at the lever arm 2691* (the manner is not shown) so as to be displaceable.

In FIG. 10, the rotation axis of the bearing shaft of the installation segment 2693* travels parallel to the y-axis of the Cartesian coordinate system. The adapter 2672* of the drive module 267* is permanently installed at the bearing shaft. The upper portion of the stack ST* rests on the main intake-side housing wall 17* of the feed station 20*, and a lower portion of the stack ST* rests on the ramp plate 265*. Depicted in FIG. 10 is a state of the stack during singulation of the lowermost flat item P1* of said stack. The displacement distance S* of the ramp plate 265* in the direction opposite the transport direction x is zero. The distance T* from the pivot point to the rotation point of the installation segment 2693* forms the power arm of the one-sided lever. A linearly movable drive rod 26711* (FIG. 11) of a linear step motor 2671* is connected positively and non-positively with the adapter 2672* of the drive module 267*. The advantage according to the second variant is that the displacement distance S* due to the lever action may be modified relative to the stroke distance H* as necessary, depending on the distance T*. An additional advantage is that a smaller structural space is required to accommodate the movement means according to the second variant. The ramp plate 265* is depicted with a displacement distance S*=0 since a displacement counter to the transport direction x has not yet occurred. For its control, the aforementioned drive module 267* is electrically connected (the manner is not shown) with the control unit. An additional sensor (not shown) for monitoring of the movement of the movement means may be provided if desired and be electrically connected with the control unit.

Figure 11:
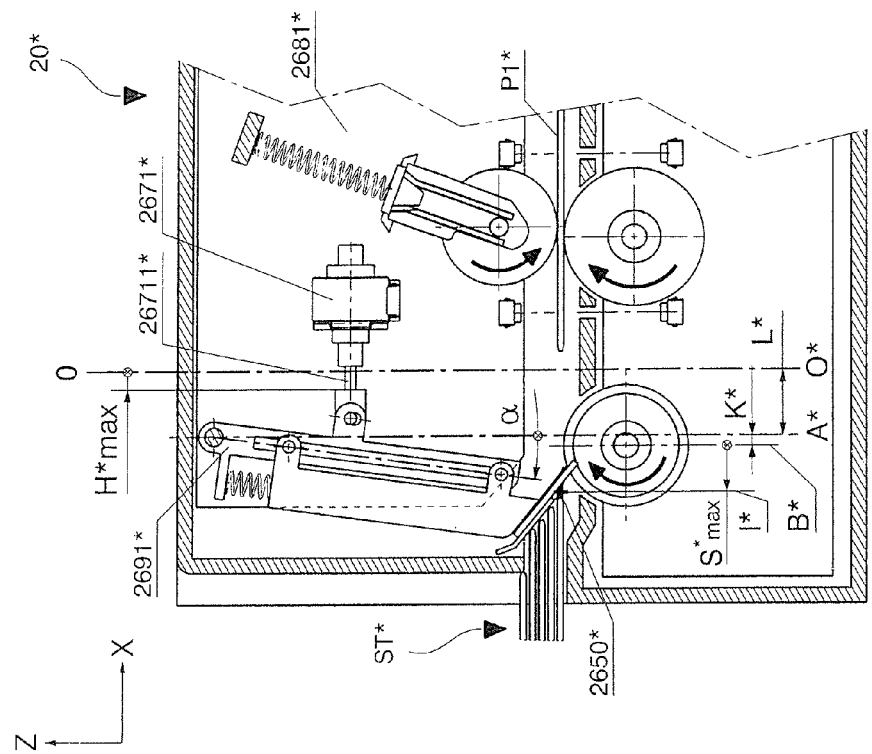
FIG. 11 is a front view in a schematic depiction in section of a feed station with a movement assembly according to the second embodiment, in an operating position resulting from a maximum stroke Hmax.

FIG. 11 is a front view of a schematic depiction in section of a feed station 20* with a movement assembly according to the second variant, in an operating position. Of the two side walls of the contact pressure box in which the bearing shaft of the lever arm 2691* is borne so as to be able to rotate, only one side wall 2681* is shown. The drive rod 26711* of the linear stepper motor 2671* is maximally extended with maximum stroke H*max, such that the lever arm 2691* is pivoted by an angle α counter to the transport direction x. In the operating position of the movement means, the stack is slid out of the main gate by the ramp plate 265* (FIG. 10), and the majority is slid back onto the placement cover (not shown). The ramp plate 265* is shown at a distance corresponding to the displacement distance S*max. For example, it is displaced by approximately 10 mm, wherein the displacement of the stack ST* takes place counter to the transport direction x. The reference point 2650* on the lateral edge of the ramp plate 265* is now no longer situated orthogonally opposite the waypoint B*; rather, the mapping of a corresponding waypoint I* is upstream at the distance S*max from the waypoint B* on the transport path. The orthogonal mapping of the pivot point of the lever arm on the transport path is designated as a waypoint A*. The waypoints K* and L* as well as O* are depicted as has already been shown in FIG. 10. Depicted in FIG. 11 is a state of the stack after a singulation of the lowermost flat item P1* of said stack and the further transport of the flat item P1*. It is provided that the separation device has an separation roller 23* (FIG. 10), and that the movement of the portion of the separation device counter to the x-direction takes place in a displacement region that amounts to at least 20%-100% of the radius of the separation roller 23*.

That the movement assembly for movement of the portion of the separation device of the items processing apparatus or of the feed station has been described only according to the first and second embodiments, but this does not preclude additional variants of the movement assembly of the feed station. Additional variants already result from a change to the movement mechanism, for example. As an alternative to the linear stepper motor, the drive module 267* may also be constructed with a different actuator.

Although modifications and changes may be suggested by those skilled in the art, it is the intention of the inventor to embody within the patent warranted hereon all changes and modifications as reasonably and properly come within the scope of his contribution to the art.

I claim as my invention:

1. An apparatus for processing flat items, comprising:
   a placement device comprising a horizontal placement surface configured to receive a stack of flat items thereon, and a vertical alignment wall adjacent said placement surface;
   said placement device comprising a plurality of transport elements that are mounted in said placement surface so as to be movable to displace said stack in a transport direction and to displace said stack transversely to said transport direction to place said stack against said alignment wall, and to also allow displacement of said stack counter to said transport direction;
   a feed deck having a horizontal feed deck surface following said placement surface in said transport direction and in horizontal alignment with said placement surface;
   a separation device comprising a separation device portion situated above said feed deck surface, and a separation roller situated below, and partially projecting above, said feed deck surface, said separation roller being situated beneath said separation device portion and forming a separation gate therewith;
   said separation device comprising an actuatable movement assembly connected to said separation device portion that, when actuated, moves said separation device portion counter to said transport direction;
   a control computer configured to emit placement device control commands that drive said transport elements to place said stack against said alignment wall and to move said stack in said transport direction toward said separation gate;
   said control computer being configured to emit, after said placement device control commands, separation device control commands that operate said separation gate to remove said flat items successively from said stack one at a time; and
   said control computer being configured to emit further separation device control commands that actuate said movement assembly to selectively move said separation device portion counter to said transport direction and thereby also displace said stack on said transport elements counter to said transport direction.

2. An apparatus as claimed in claim 1 wherein each of said transport elements comprises a drum-shaped rotation body having a largest diameter at a body equator and a rubber roller applied asymmetrically onto the rotation body on opposite sides of said drum equator, and wherein said rotation body is rotatable around a rotation axis proceeding through and perpendicular to, said equator, with said rubber roller having a wider running surface on one side of said equator compared to an opposite side, giving said rotation body a lateral running surface on one side of the drum that terminates with a thinner running surface, with said lateral running surface having a lower coefficient of friction than said running surface of said rubber roller, and wherein said placement surface of said placement device comprises circular openings therein, equal in number to said plurality of transport elements, with each rotation body being mounted in a plate in the respective circular opening allowing rotation of said rotation axis and said equator within said placement surface, in response to said placement device control commands.

3. An apparatus as claimed in claim 2 wherein a first alignment state of the transport elements of the placement device or placement station is provided that enables a displacement of the stack counter to the transport direction, and in which the direction of the rotation axis of the rotation body coincides with the transport direction, and the lateral running surface of the molded rotation body is brought into a position downstream of the drum-shaped rubber roller.

4. An apparatus as claimed in claim 1 wherein the placement deck requires a smaller placement surface than a largest format of a flat good that is to be processed.

5. An apparatus as claimed in claim 1 wherein a common control unit is provided to control the placement and separation devices of the goods processing apparatus, and the placement and separation devices are arranged in a common housing.

6. An apparatus as claimed in claim 1 wherein the placement device is arranged in a placement station and the separation device is arranged in a feed station, and wherein a respective control unit is provided in the placement station and in the feed station, and wherein the control unit of the feed station is connected in terms of communication with the control unit of the placement station.

7. An apparatus as claimed in claim 6 wherein the placement station has at least one sensor, encoders, a drive motor and an associated movement mechanism, as well as an interface, and wherein the feed station has at least one interface and a control unit, and wherein the drive motor of the transport elements of the placement station are controlled via the interfaces from the control unit of the feed station, and wherein respective sensor signals and encoder signals of the at least one sensor, and the encoders, of the placement station are polled by the control unit.

8. An apparatus as claimed in claim 6 comprising sensors that monitor movement of the flat goods in the placement and separation devices and the feed station, wherein the sensor signals are evaluated by the respective control units of the placement device and the feed station.

9. An apparatus as claimed in claim 1 wherein the movement assembly comprises a drive motor with an associated movement mechanism to move the portion of the separation device in the transport direction and counter to the transport direction.

10. An apparatus as claimed in claim 1 the movement of the portion of the separation device counter to the transport direction takes place in a displacement region that amounts to at least 20%-100% of a radius of the separation roller.

11. An apparatus as claimed in claim 1 wherein the movement of the portion of the separation device counter to the transport direction takes place in a displacement region that is at least half as large as a radius of the separation roller.

12. A non-transitory, computer-readable data storage medium encoded with programming instructions, said storage medium being loaded into a control computer of an apparatus for processing flat items, said apparatus comprising a placement device comprising a horizontal placement surface configured to receive a stack of flat items thereon, and a vertical alignment wall adjacent said placement surface, said placement device comprising a plurality of transport elements that are mounted in said placement surface so as to be movable to displace said stack in a transport direction and to displace said stack transversely to said transport direction to place said stack against said alignment wall, and to also allow displacement of said stack counter to said transport direction, a feed deck having a horizontal feed deck surface following said placement surface in said transport direction and in horizontal alignment with said placement surface, a separation device comprising a separation device portion situated above said feed deck surface, and a separation roller situated below, and partially projecting above, said feed deck surface, said separation roller being situated beneath said separation device portion and forming a separation gate therewith, said separation device comprising an actuatable movement assembly connected to said separation device portion that, when actuated, moves said separation device portion counter to said transport direction, said programming instructions causing said control computer to:
   emit placement device control commands that drive said transport elements to place said stack against said alignment wall and to move said stack in said transport direction toward said separation gate;
   emit, after said placement device control commands, separation device control commands that operate said separation gate to remove said flat items successively from said stack one at a time; and
   emit further separation device control commands that actuate said movement assembly to selectively move said separation device portion counter to said transport direction and thereby also displace said stack on said transport elements counter to said transport direction.

13. An apparatus as claimed in claim 1 wherein said placement station comprises a drive motor operated by said placement device commands to drive said transport elements to place said stack against said alignment wall and to move said stack in said transport direction toward said separation gate.

14. A method for operating an apparatus for processing flat items, said apparatus comprising a placement device comprising a horizontal placement surface configured to receive a stack of flat items thereon, and a vertical alignment wall adjacent said placement surface, said placement device comprising a plurality of transport elements that are mounted in said placement surface so as to be movable to displace said stack in a transport direction and to displace said stack transversely to said transport direction to place said stack against said alignment wall, and to also allow displacement of said stack counter to said transport direction, a feed deck having a horizontal feed deck surface following said placement surface in said transport direction and in horizontal alignment with said placement surface, a separation device comprising a separation device portion situated above said feed deck surface, and a separation roller situated below, and partially projecting above, said feed deck surface, said separation roller being situated beneath said separation device portion and forming a separation gate therewith, said separation device comprising an actuatable movement assembly connected to said separation device portion that, when actuated, moves said separation device portion counter to said transport direction, said method comprising:
   from a control computer, emitting placement device control commands that drive said transport elements to place said stack against said alignment wall and to move said stack in said transport direction toward said separation gate;

from said control computer, emitting after said placement device control commands, separation device control commands that operate said separation gate to remove said flat items successively from said stack one at a time; and from said control computer, emitting further separation device control commands that actuate said movement assembly to selectively move said separation device portion counter to said transport direction and thereby also displace said stack on said transport elements counter to said transport direction.

\* \* \* \* \*